(12) United States Patent
Ben-Eli

(10) Patent No.: US 8,897,224 B2
(45) Date of Patent: Nov. 25, 2014

(54) REDUCING PUBLIC LAND MOBILE NETWORK PLMN SEARCH TIME

(75) Inventor: David Ben-Eli, Modiin (IL)

(73) Assignee: Marvell World Trade Ltd., St. Michael (BB)

( * ) Notice: Subject to any disclaimer, the term of this patent is extended or adjusted under 35 U.S.C. 154(b) by 144 days.

(21) Appl. No.: 13/558,351

(22) Filed: Jul. 26, 2012

(65) Prior Publication Data

US 2013/0028119 A1   Jan. 31, 2013

Related U.S. Application Data

(60) Provisional application No. 61/512,219, filed on Jul. 27, 2011, provisional application No. 61/622,254, filed on Apr. 10, 2012.

(51) Int. Cl.
*H04W 4/00* (2009.01)
*H04W 48/16* (2009.01)
*H04W 48/20* (2009.01)
*H04W 48/18* (2009.01)

(52) U.S. Cl.
CPC .............. *H04W 48/16* (2013.01); *H04W 48/20* (2013.01); *H04W 48/18* (2013.01)
USPC .......................................... 370/328; 370/329

(58) Field of Classification Search
CPC ...... H04W 48/00; H04W 48/18; H04W 48/20
USPC .................... 370/328, 329, 331, 332
See application file for complete search history.

(56) References Cited

U.S. PATENT DOCUMENTS

| 6,542,716 | B1 | 4/2003 | Dent et al. |
| 7,035,646 | B2 | 4/2006 | Raffel et al. |
| 7,577,188 | B1 | 8/2009 | Lewis |
| 8,311,576 | B2 * | 11/2012 | Islam et al. ................ 455/552.1 |
| 8,626,169 | B2 | 1/2014 | Lee et al. |
| 2004/0253952 | A1 | 12/2004 | Rager et al. |
| 2005/0075125 | A1 | 4/2005 | Bada et al. |

(Continued)

FOREIGN PATENT DOCUMENTS

| EP | 1422962 A1 | 5/2004 |
| WO | 03063538 A1 | 7/2003 |
| WO | 2011068557 A1 | 6/2011 |

OTHER PUBLICATIONS

European Patent Application # 13156182 search report dated May 16, 2013.

(Continued)

*Primary Examiner* — Farah Faroul

(57) ABSTRACT

A method includes storing in a mobile communication terminal a definition of a set of frequency bands in which the terminal is capable of communicating, including at least first and second frequency bands. One or more combinations of at least portions of the frequency bands in the set, which cannot be allocated in proximity to one another due to interference, are determined in the terminal. A search is conducted in the terminal over the set of the frequency bands. Upon detecting a presence of a candidate wireless network in a first portion of the first frequency band, which cannot be allocated in proximity to at least a second portion of the second frequency band in accordance with the specification, at least the second portion is omitted from the search.

20 Claims, 3 Drawing Sheets

(56) References Cited

U.S. PATENT DOCUMENTS

| | | | |
|---|---|---|---|
| 2006/0068782 A1* | 3/2006 | Kuriyama | 455/434 |
| 2007/0211669 A1* | 9/2007 | Umatt et al. | 370/335 |
| 2007/0253319 A1 | 11/2007 | Jansen | |
| 2009/0124224 A1 | 5/2009 | Hildebrand et al. | |
| 2009/0156206 A1* | 6/2009 | Rathonyi et al. | 455/434 |
| 2009/0270103 A1* | 10/2009 | Pani et al. | 455/436 |
| 2009/0298497 A1* | 12/2009 | Lee | 455/434 |
| 2010/0081433 A1 | 4/2010 | Lee | |
| 2010/0091674 A1* | 4/2010 | Sjogren et al. | 370/252 |
| 2010/0099399 A1* | 4/2010 | Nayak et al. | 455/422.1 |
| 2010/0216460 A1* | 8/2010 | Wu | 455/434 |
| 2010/0330977 A1 | 12/2010 | Kadous et al. | |
| 2011/0122976 A1 | 5/2011 | Lei et al. | |
| 2011/0263252 A1* | 10/2011 | Saini et al. | 455/434 |
| 2012/0128086 A1 | 5/2012 | Bouzegzi et al. | |
| 2012/0140799 A1 | 6/2012 | Lim et al. | |
| 2012/0236919 A1* | 9/2012 | Alliot et al. | 375/224 |
| 2012/0264425 A1 | 10/2012 | Krishnamoorthy et al. | |
| 2013/0045747 A1* | 2/2013 | Islam et al. | 455/437 |

OTHER PUBLICATIONS

3GPP TS 45.005, "3rd Generation Partnership Project: Technical Specification Group GSM/Edge Radio Access Network; Radio Transmission and Reception (release 10)", version 10.1.0, May 2011.

3GPP TS 25.101, "3rd Generation Partnership Project: Technical Specification Group Radio Access Network; User Equipment (UE) Radio Transmission and Reception (FDD) (release 10)", version 10.2.0, Jun. 2011.

3GPP TS 36.101, "3rd Generation Partnership Project: Technical Specification Group Radio Access Network; Evolved Universal Terrestrial Radio Access (E-UTRA); User Equipment (UE) Radio Transmission and reception (release 10)", version 10.3.0, Jun. 2011.

International Application PCT/IB2012/053812 search report dated Dec. 3, 2012.

U.S. Appl. No. 61/601,291, filed Feb. 12, 2012.

U.S. Appl. No. # 13/766,798 Office Action dated Jun. 19, 2014.

* cited by examiner

# REDUCING PUBLIC LAND MOBILE NETWORK PLMN SEARCH TIME

CROSS-REFERENCE TO RELATED APPLICATIONS

This application claims the benefit of U.S. Provisional Patent Application 61/512,219, filed Jul. 27, 2011, and U.S. Provisional Patent Application 61/622,254, filed Apr. 10, 2012, whose disclosures are incorporated herein by reference.

FIELD OF THE DISCLOSURE

The present disclosure relates generally to mobile networks, and particularly to methods and systems for selection of mobile network bands.

BACKGROUND

A public land mobile network (PLMN) is a regulatory term in telecommunications, referring to a network that is operated for the purpose of providing land mobile communication services to the public. A PLMN is identified by the Mobile Country Code (MCC) and the Mobile Network Code (MNC). Access to PLMN services is achieved by means of an air interface involving radio communications between mobile phones, or other wireless enabled user equipment (UE), and land based radio transmitters or radio base stations (BS).

A given PLMN operates in accordance with a certain radio access technology (RAT), such as, for example, global system for mobile communications (GSM), wideband code-division multiple access (WCDMA) or long term evolution (LTE).

The GSM air interface is specified, for example, in "3$^{rd}$ Generation Partnership Project; Technical Specification Group GSM/EDGE Radio Access Network; Radio transmission and reception (Release 10)," 3GPP specification TS 45.005, version 10.1.0, May, 2011, which is incorporated herein by reference. Section 2 of this standard specifies uplink and downlink frequency bands that may be allocated to GSM networks.

The WCDMA air interface is specified, for example, in "3$^{rd}$ Generation Partnership Project; Technical Specification Group Radio Access Network; User Equipment (UE) radio transmission and reception (FDD) (Release 10)," 3GPP specification TS 25.101, version 10.2.0, June, 2011, which is incorporated herein by reference. Section 5 of this standard specifies uplink and downlink frequency bands that may be allocated to WCDMA networks.

The LTE air interface is specified, for example, in "3$^{rd}$ Generation Partnership Project; Technical Specification Group Radio Access Network; Evolved Universal Terrestrial Radio Access (E-UTRA); User Equipment (UE) radio transmission and reception (Release 10)," 3GPP specification TS 36.101, version 10.3.0, June, 2011, which is incorporated herein by reference. Section 5 of this standard specifies uplink and downlink frequency bands that may be allocated to LTE networks.

The description above is presented as a general overview of related art in this field and should not be construed as an admission that any of the information it contains constitutes prior art against the present patent application.

SUMMARY

An embodiment that is described herein provides a method, which includes storing in a mobile communication terminal a definition of a set of frequency bands in which the terminal is capable of communicating, including at least first and second frequency bands. One or more combinations of at least portions of the frequency bands in the set, which cannot be allocated in proximity to one another due to interference, are determined in the terminal. A search is conducted in the terminal over the set of the frequency bands. Upon detecting a presence of a candidate wireless network in a first portion of the first frequency band, which cannot be allocated in proximity to at least a second portion of the second frequency band in accordance with the specification, at least the second portion is omitted from the search.

In some embodiments, storing the definition includes specifying that the terminal is capable of communicating in the first and second frequency bands using first and second different Radio Access Technologies (RAT), respectively. In an example embodiment, specifying the RAT includes specifying that the terminal is capable of communicating in one of the first and second frequency bands using Frequency Division Duplex (FDD), and in the other of the first and second frequency bands using Time Division Duplex (TDD).

In a disclosed embodiment, detecting the presence includes evaluating the first portion without being camped on any wireless network. In an alternative embodiment, detecting the presence includes identifying that the terminal is camped on a wireless network. In an embodiment, detecting the presence includes evaluating the first portion while the terminal is camped on a wireless network in a third frequency band in the set.

In some embodiments the method includes, prior to the search, recording in the terminal one or more previous wireless networks that the terminal communicated with, and respective frequency channels and country codes of the previous wireless networks, and removing the second portion from the search upon detecting that the terminal is currently operating in a given country and that one of the previous wireless networks recorded in the given country operates in the first portion. Typically, conducting the search includes searching over the frequency bands in the set for a valid wireless network.

In some embodiments, the method includes omitting the second portion from the search upon detecting that a downlink or uplink frequency of the candidate wireless network falls in the first portion. In an embodiment, determining the combinations includes calculating the combinations in the terminal based on the stored definition of the frequency bands. Alternatively, determining the combinations includes storing a predefined specification of the combinations in the terminal.

There is additionally provided, in accordance with an embodiment that is described herein, apparatus including a transceiver and a processor. The transceiver is configured to communicate with wireless networks. The processor is configured to store a definition of a set of frequency bands in which the transceiver is capable of communicating, including at least first and second frequency bands, to determine one or more combinations of at least portions of the frequency bands in the set that cannot be allocated in proximity to one another due to interference, to conduct using the transceiver a search over the set of the frequency bands, and, upon detecting a presence of a candidate wireless network in a first portion of the first frequency band, which cannot be allocated in proximity to at least a second portion of the second frequency band in accordance with the specification, to omit at least the second portion from the search.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
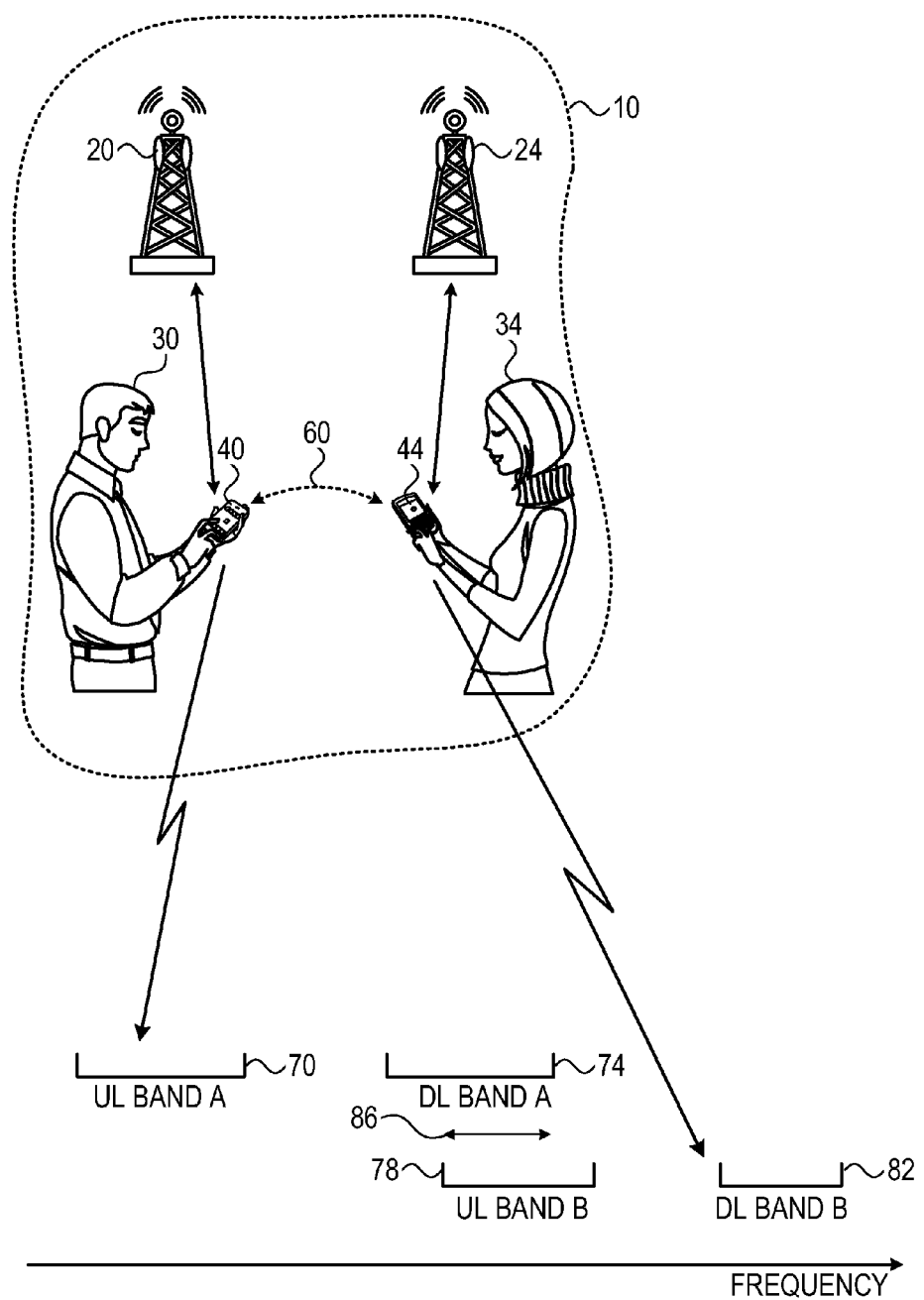
FIG. 1 is a diagram that shows user equipment (UE) communicating with respective public land mobile networks (PLMNs), and associated frequency allocations, in accordance with an embodiment that is described herein.

A public land mobile network (PLMN) search occurs when a first UE located in a geographic region scans the frequency spectrum for available PLMNs to communicate with. The region often comprises other UEs communicating with one or more PLMNs. Interference may occur between the first UE and other UEs in the region, for example, if the transmit frequency of the first UE overlaps with a portion of the receive frequency bands of the other UEs, or vice versa. The interference results, for example from the transmitted signal of the first UE passing through the receive filter within the receive band of the second UE. The receiver of the second UE becomes saturated by the interference signal due to the first UE transmission being stronger than the intended receive signal from a base station that is more distant than the first UE.

Due to interference scenarios of this sort, it is highly unlikely that different PLMNs in a given geographical region will be allocated portions of bands that have overlapping frequencies. Thus, if a UE has knowledge of an existing PLMN in a first frequency in a first band, it may avoid performing a PLMN search over portions of second frequency bands comprising potentially-interfering combinations of first and second overlapping bands which unnecessarily lengthen the PLMN search time.

Normally, a UE will perform a frequency scan over a predefined set of frequency bands to identify available candidate wireless networks, also referred to as candidate PLMNs, with which to communicate. For example, if the UE supports two Wideband Code Division Multiple Access (WCDMA) bands and four Global System for Mobile Communications (GSM) bands, six bands will be scanned. As the complexity of UEs, such as smartphones, increases by supporting multiple frequency bands, along with the need for global mobility, the number of frequency bands that the UE device scans increases, which in turn lengthens the PLMN search time.

The embodiments described hereinbelow provide methods for reducing PLMN search time. The reduction in PLMN search time reduces power consumption and thus increases the battery life of the UE, and also improves the user's experience.

In some embodiments, a set of frequency band definitions is stored in a lookup table (LUT) in the UE. The UE can store in the LUT illegal combinations of entire frequency bands or portions of frequency bands that collide or overlap. The illegal collision combinations can be determined either by direct computation from the band definitions, or known a priori and stored in the LUT or otherwise in the UE. In other words, the illegal combinations identify portions of the set of frequency bands in which interference may occur.

During a PLMN search, if the UE detects the presence of a candidate wireless network in a first portion of a currently-searched frequency band, and the specification stored in the LUT indicates that at least a second portion of a second frequency band cannot be allocated in proximity to the first portion due to interference, the UE omits the second portion from the search, and thus reduces the overall PLMN search time.

FIG. 1 is a diagram showing two wireless communication terminals (UEs) 40 and 44 communicating with respective base stations 20 and 24 in a geographical region 10, in accordance with an embodiment that is described herein. (The base stations are sometimes referred to as NodeB or eNodeB in various standards.) In this example, two users 30 and 34 operate UEs 40 and 44 denoted UE_A and UE_B, respectively.

UE_A 40 and base station 20 belong to one PLMN, while UE_B 44 and base station 24 belong to a different PLMN. If a suitable transmission frequency of UE_A 40 is not selected, interference 60 may corrupt the communication of one or both of the UEs, and vice versa.

In the present example, although not necessarily, both PLMNs use the same radio access technology (RAT)—WCDMA. To better illustrate the effect of interference 60 between different PLMNs, WCDMA bands are shown in Table I below. UE_A 40 transmits information to base station 20 on an uplink (UL) carrier frequency and receives information from base station 20 on a downlink (DL) carrier frequency with one of the eighteen UL and DL frequency band combinations listed in Table I below.

TABLE I

| | WCDMA Band Definitions (reproduced from Table 5.1 of 3GPP TS 25.101) | | | | | |
|---|---|---|---|---|---|---|
| | UPLINK (UL) UE transmit, NodeB receive | | | DOWNLINK (DL) UE receive, NodeB transmit | | |
| Band | UARFCN formula offset $F_{UL\_offset}$ (MHz) | Carrier Frequency ($F_{UL}$) Range (MHz) | | UARFCN formula offset $F_{DL\_offset}$ (MHz) | Carrier Frequency ($F_{DL}$) Range (MHz) | |
| | | $F_{UL\_low}$ | $F_{UL\_high}$ | | $F_{DL\_low}$ | $F_{DL\_high}$ |
| I | 0 | 1922.4 | 1977.6 | 0 | 2112.4 | 2167.6 |
| II | 0 | 1852.4 | 1907.6 | 0 | 1932.4 | 1987.6 |
| III | 1525 | 1712.4 | 1782.6 | 1575 | 1807.4 | 1877.6 |
| IV | 1450 | 1712.4 | 1752.6 | 1805 | 2112.4 | 2152.6 |
| V | 0 | 826.4 | 846.6 | 0 | 871.4 | 891.6 |

TABLE I-continued

WCDMA Band Definitions (reproduced from Table 5.1 of 3GPP TS 25.101)

| | UPLINK (UL) UE transmit, NodeB receive | | | DOWNLINK (DL) UE receive, NodeB transmit | | |
|---|---|---|---|---|---|---|
| | UARFCN formula offset | Carrier Frequency ($F_{UL}$) Range (MHz) | | UARFCN formula offset | Carrier Frequency ($F_{DL}$) Range (MHz) | |
| Band | $F_{UL\_offset}$ (MHz) | $F_{UL\_low}$ | $F_{UL\_high}$ | $F_{DL\_offset}$ (MHz) | $F_{DL\_low}$ | $F_{DL\_high}$ |
| VI | 0 | 832.4 | 837.6 | 0 | 877.4 | 882.6 |
| VII | 2100 | 2502.4 | 2567.6 | 2175 | 2622.4 | 2687.6 |
| VIII | 340 | 882.4 | 912.6 | 340 | 927.4 | 957.6 |
| IX | 0 | 1752.4 | 1782.4 | 0 | 1847.4 | 1877.4 |
| X | 1135 | 1712.4 | 1767.6 | 1490 | 2112.4 | 2167.6 |
| XI | 733 | 1430.4 | 1445.4 | 736 | 1478.4 | 1493.4 |
| XII | −22 | 701.4 | 713.6 | −37 | 731.4 | 743.6 |
| XIII | 21 | 779.4 | 784.6 | −55 | 748.4 | 753.6 |
| XIV | 12 | 790.4 | 795.6 | −63 | 760.4 | 765.6 |
| XIX | 770 | 832.4 | 842.6 | 735 | 877.4 | 887.6 |
| XX | −23 | 834.4 | 859.6 | −109 | 793.4 | 818.6 |
| XXI | 1358 | 1450.4 | 1460.4 | 1326 | 1498.4 | 1508.4 |
| XXV | 875 | 1852.4 | 1912.6 | 910 | 1932.4 | 1992.6 |

As shown at the bottom of FIG. 1, UE_A 40 receives the base station signals on a downlink channel that is assigned to it within a downlink frequency band 74 denoted DL BAND A, and transmits signals to the base station on an uplink channel that is assigned to it within an uplink frequency band 70 denoted UL BAND A. Similarly, UE_B 44 receives signals on a downlink channel that is assigned to it within a downlink frequency band 82 denoted DL BAND B, and transmits signals on an uplink channel that is assigned to it within an uplink frequency band 78 denoted UL BAND B. The above named bands of FIG. 1 correspond to the eighteen UL and DL band combinations denoted Band I to Band XXV as shown in Table I for the case of WCDMA-based communication.

The overlapping portion of DL BAND A 74 and UL BAND B 78 is shown as an illegal collision sub-band 86 in FIG. 1. Illegal collision sub-band 86 may comprise all or part of DL BAND A 74 and/or UL BAND B 78. Illegal collision sub-band 86 may also be referred in later embodiments as a partially colliding band, or a partially colliding band overlap.

When UE_B 44 communicates with a PLMN that assigns an UL transmit frequency in overlapping portion 86 of UL BAND B 78, the transmitted signal from UE_B 44 can interfere with reception of UE_A 40 on DL BAND A 74. Interference 60 may saturate the receiver of UE_A 40 or otherwise interfere with proper reception. Such interference may result in a degradation or disruption of the communication between UE_A 40 and its respective PLMN.

Note that such communication disruptions may occur even if the UL channel of UE_B in UL BAND B 78 is not at the exact DL receive channel of UE_A 40, but is within illegal overlap collision sub-band 86. Thus, if a PLMN has an UL channel within a DL BAND, that band is highly unlikely to be assigned to a different PLMN within the same geographical region, otherwise the interference between UEs belonging to those PLMNs will be unacceptable. In other scenarios, UE_B 44 can transmit a signal within UL BAND B 78, but outside of the illegal overlap collision sub-band 86 without affecting the performance of UE_A 40.

In the embodiments shown herein, if UE_B 44 detects the presence of a PLMN in BAND B during PLMN search, it omits at least the illegal overlap collision sub-band 86 from the PLMN search to reduce the PLMN search time. Illegal overlap collision sub-band combinations between portions of the UL and DL bands for WCDMA can be calculated from Table I. For example, when UL BAND B is 1920-1980 MHz (Band I in Table I) and DL BAND A is 1930-1990 MHz (Band II in Table I), overlap collision sub-band 86 is 1930-1980 MHz. Table II shows the WCDMA band combinations resulting in partially colliding WCDMA bands.

TABLE II

WCDMA band combinations resulting in partially colliding band

| WCDMA Band | Partially colliding WCDMA Bands |
|---|---|
| I | II, XXV |
| II | I, III, IX |
| III | II, XXV |
| IV | — |
| V | VIII |
| VI | VIII |
| VII | — |
| VIII | V, VI, XIX |
| IX | II, XXV |
| X | — |
| XI | — |
| XII | — |
| XIII | — |
| XIV | XX |
| XIX | VIII |
| XX | XIV |
| XXI | — |
| XXV | I, III, IX |

In the embodiments presented herein, the UE is configured to reduce the PLMN search time as described below. For the WCDMA bands presented earlier, if the UE detects the presence of a PLMN in a first band in which a portion of the frequency band is known a priori to comprise a partial colliding band with a second band, the UE omits searching for a candidate PLMN within the overlap collision sub-band in the second band, which consequently reduces PLMN search. In an embodiment, the UE omits the entire second band from the search, not only the overlap collision band.

The UE is typically configured to store a definition of the PLMN search frequencies and determine the overlap collision sub-band, which may be an entire frequency band or a portion of a frequency band, in a lookup table.

In some embodiments, the portion of DL BAND A 74 that is outside of overlap band 86 is still included in the PLMN search. However, in other embodiments, DL BAND A 74 is omitted completely from the PLMN search. Note that the two UEs can typically transmit in the same UL band or receive in the same DL band without interference.

In some embodiments, the omitted portion of the band is not the same portion in which the UE detected the candidate wireless network. Consider the example of FIG. 1. In an embodiment, a UE will detect a PLMN in BAND B by receiving downlink channel in DL BAND B 82. DL BAND B 82 does not itself overlap any of the other bands. Nevertheless, according to the band definition, the UE concludes that the corresponding UL channel (within UL BAND B 78) overlaps with DL BAND A 74. Based on this conclusion, the UE will omit at least overlap sub-band 86 of BAND A from the search.

As another example, if UE A 40 detects a DL channel in DL band B 74, within overlap sub-band 86, it may conclude that no UL channels are allocated in this sub-band. Based on this conclusion, UE A omits the corresponding region in DL band B 82 from the PLMN search, even though DL band B 82 is outside overlap sub-band 86.

The embodiment shown in FIG. 1 is chosen solely by way of example and not by way of limitation. The scenario shown in FIG. 1 is purely illustrative and will typically not occur in real life, since two PLMNs will typically not allocate overlapping frequency bands in the same region.

The PLMN search is typically initiated under a variety of scenarios. When the UE is powered up, for example, the PLMN search is initiated. A manual PLMN may be initiated by a user if the user is outside of the user's home PLMN, such as when the user is in another country and wishes to select a specific PLMN known a priori to the user to be of lower usage costs. These scenarios are typically a one-time occurrence at UE power up.

In other scenarios, repetitive PLMN searches are initiated by the UE, such as when the UE is roaming and searches repeatedly for the home PLMN, which is selected when available. In emergency mode, the UE is provided with limited wireless services on a limiting PLMN. Repeated PLMN searches are typically performed to enable the UE to return from emergency mode to normal functionality on a different PLMN. In another scenario, when the UE does not find any PLMN, out-of-service (OOS) conditions result. The UE then performs repetitive PLMN searches to enable the UE to return to normal functionality upon finding an available PLMN.

In an embodiment, the UE is camped, or already communicating, with a given PLMN on a given band when conducting the PLMN search. In such a case, the UE is able to regard the PLMN it is camped on as a "detected PLMN" and omit sub-bands that illegally overlap with this PLMN from the PLMN search. For example, if the UE is camped on a PLMN of band I (or II), within the collision sub-band, then the UE is able to omit the resulting collision sub-band in band II (or I), respectively.

Figure 2:
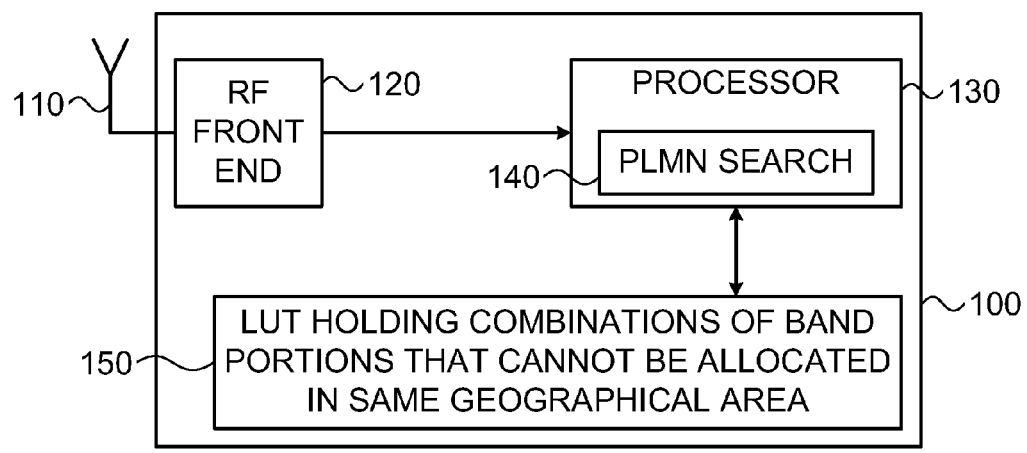
FIG. 2 is a block diagram that schematically illustrates a UE comprising a PLMN search module, in accordance with an embodiment that is described herein.

FIG. 2 is a block diagram that schematically illustrates a UE 100 comprising a PLMN search module 140, in accordance with an embodiment that is described herein. UE 100 comprises an antenna 110, an RF Front End block 120, a UE processor 130, and a lookup table (LUT) 150. RF Front End block 120 is also referred to herein as a transceiver (transmitter/receiver).

LUT 150 holds combinations of band portions that cannot be allocated in same geographical area due to potential interference. RF Front End block 120 controls the transmit (UL) and receive (DL) signals when the UE is communicating with the PLMN. Processor 130 comprises PLMN search module 140, which conducts the improved PLMN search processes described herein.

The UE configuration shown in FIG. 2 is an example configuration, which is chosen solely for the sake of clarity. In alternative embodiments, any other suitable UE configuration can also be used. UE elements that are not mandatory for understanding of the disclosed techniques, such as transmission circuitry, have been omitted from the figure for the sake of clarity.

PLMN search module 140 can be implemented as a stand-alone module, a separate chip, or embedded unit in a chipset comprised in the UE. Certain elements of UE 100, such as processor 130 including PLMN search module 140, can be implemented in software to carry out the functions described herein. LUT 150 may be implemented in any suitable type of memory, such as Random Access Memory (RAM), Read Only Memory (ROM) or Flash memory, for example.

Processor 130 may be implemented in hardware, e.g., directly in one or more of the chipsets comprised by the UE, or in one or more Application-Specific Integrated Circuits (ASICs) or Field-Programmable Gate Arrays (FPGAs). Additionally or alternatively, some processor elements can be implemented using software, or using a combination of hardware and software elements. In some embodiments, processor 130 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

In some embodiments, UE 100 may comprise a database, in the LUT or other memory, for recording a history of the PLMNs with which the UE previously communicated. For a given PLMN, the database may store, for example, the mobile country code (MCC), mobile network code (MNC) and respective frequency channels of the previous PLMNs, and possibly additional parameters.

For example, if the UE is camped on WCDMA Band IV with an MCC of country "COUNTRY1" and initiates a PLMN search, or if the UE had just located a valid PLMN on WCDMA Band IV with MCC="COUNTRY1" and initiates a PLMN search, UE 100 can search the stored database to recognize that it had previously identified a PLMN with MCC=COUNTRY1 that uses WCDMA channels in Band I within the collision sub-band of Band II. This information will enable the UE to avoid scanning the illegal overlap collision sub-bands of WCDMA Band II even before detecting a valid PLMN on WCDMA Band I.

In other embodiments, the UE may support GSM bands, which are shown below in Table III. The UE stores the GSM overlap collision sub-band information, which can be calculated from Table III, in LUT 150. For example, consider the DCS-1800 and PCS-1900 bands. When UL BAND B 74 is 1850.2-1910.2 MHz for PCS-1900 and overlaps with a DL BAND A of 1805.2-1879.8 MHz, which is the DL frequency band for DCS-1800, overlap collision sub-band 86 is 1850.2-1879.8 MHz for this GSM scenario. Other illegal GSM overlap collision sub-bands occur for combinations of GSM-850 with P,E,R,T-GSM-900.

TABLE III

GSM Band Definitions (reproduced from
Section. 2 of 3GPP TS 45.005)

| Band | UL Carrier Frequency ($F_{UL}$) range (MHz) | | DL Carrier Frequency ($F_{DL}$) range (MHz) | |
|---|---|---|---|---|
| | $F_{UL\_low}$ | $F_{UL\_high}$ | $F_{DL\_low}$ | $F_{DL\_high}$ |
| T-GSM-380 | 380.2 | 389.8 | 390.2 | 399.8 |
| T-GSM-410 | 410.2 | 419.8 | 420.2 | 429.8 |
| GSM-450 | 450.6 | 457.6 | 460.6 | 467.6 |
| GSM-480 | 479.0 | 486.0 | 489.0 | 496.0 |
| GSM-710 | 698.2 | 716.2 | 728.2 | 746.2 |
| GSM-750 | 747.2 | 762.2 | 777.2 | 792.2 |
| T-GSM-810 | 806.2 | 821.2 | 851.2 | 866.2 |
| GSM-850 | 824.2 | 849.2 | 869.2 | 894.2 |
| P-GSM-900 | 890.0 | 915.0 | 935.0 | 960.0 |
| E-GSM-900 | 880.0 | 915.0 | 925.0 | 960.0 |
| R-GSM-900 | 876.0 | 915.0 | 921.0 | 960.0 |
| T-GSM-900 | 870.4 | 876.0 | 915.4 | 921.0 |
| DCS-1800 | 1710.2 | 1784.8 | 1805.2 | 1879.8 |
| PCS-1900 | 1850.2 | 1910.2 | 1930.2 | 1990.2 |

In other embodiments, the UE may support LTE bands, which are shown below in Table IV. Note that the first ten LTE bands are the same as the WCDMA bands shown in Table I. The UE typically stores in LUT 150 the illegal LTE overlap collision band combinations that can be obtained from Table IV. Table IV also lists the duplex mode, i.e. whether the UL band and DL band use Frequency Division Duplex (FDD) or Time Division Duplex (TDD) communication schemes. Note that for LTE TDD, both the UL and DL bands are the same frequency band. Thus, a PLMN in a TDD band cannot be collocated with a PLMN in an FDD band where either the DL or the UL channel of the FDD PLMN overlap with the TDD frequency band.

In other embodiments, a UE supporting multiple Radio Access Technologies (multi-RAT) is also capable of identifying partial overlap collision sub-bands between different RATs, such as LTE, WCDMA, and GSM. For example, Table V below comprises a list of GSM and WCDMA frequency band combinations with partial overlap collision sub-bands. The same omission criteria described above for the case of a single RAT, can be extended to multi-RAT. If a UE detects a PLMN within a first RAT in band A, and this PLMN is within the collision area of band B in a second RAT, the UE will omit the collision overlap sub-band in band B from the PLMN search.

TABLE IV

LTE Band Definitions (reproduced from
Table 5.5-1 of 3GPP TS 36.101)

| E-UTRA Operating Band | UPLINK (UL) Operating Band BS receive UE transmit $F_{UL\_low}$-$F_{UL\_high}$ | DOWNLINK (DL) Operating Band BS transmit UE receive $F_{DL\_low}$-$F_{DL\_high}$ | Duplex Mode |
|---|---|---|---|
| 1 | 1920-1980 MHz | 2110-2170 MHz | FDD |
| 2 | 1850-1910 MHz | 1930-1990 MHz | FDD |
| 3 | 1710-1785 MHz | 1805-1880 MHz | FDD |
| 4 | 1710-1755 MHz | 2110-2155 MHz | FDD |
| 5 | 824-849 MHz | 869-894 MHz | FDD |
| 6[1] | 830-840 MHz | 875-885 MHz | FDD |
| 7 | 2500-2570 MHz | 2620-2690 MHz | FDD |
| 8 | 880-915 MHz | 925-960 MHz | FDD |
| 9 | 1749.9-1784.9 MHz | 1844.9-1879.9 MHz | FDD |
| 10 | 1710-1770 MHz | 2110-2170 MHz | FDD |
| 11 | 1427.9-1447.9 MHz | 1475.9-1495.9 MHz | FDD |
| 12 | 699-716 MHz | 729-746 MHz | FDD |
| 13 | 777-787 MHz | 746-756 MHz | FDD |
| 14 | 788-798 MHz | 758-768 MHz | FDD |
| 15 | Reserved | Reserved | FDD |
| 16 | Reserved | Reserved | FDD |
| 17 | 704-716 MHz | 734-746 MHz | FDD |
| 18 | 815-830 MHz | 860-875 MHz | FDD |
| 19 | 830-845 MHz | 875-890 MHz | FDD |
| 20 | 832-862 MHz | 791-821 MHz | FDD |
| 21 | 1447.9-1462.9 MHz | 1495.9-1510.9 MHz | FDD |
| ... | | | |
| 24 | 1626.5-1660.5 MHz | 1525-1559 MHz | FDD |
| ... | | | |
| 33 | 1900-1920 MHz | 1900-1920 MHz | TDD |
| 34 | 2010-2025 MHz | 2010-2025 MHz | TDD |
| 35 | 1850-1910 MHz | 1850-1910 MHz | TDD |
| 36 | 1930-1990 MHz | 1930-1990 MHz | TDD |
| 37 | 1910-1930 MHz | 1910-1930 MHz | TDD |
| 38 | 2570-2620 MHz | 2570-2620 MHz | TDD |
| 39 | 1880-1920 MHz | 1880-1920 MHz | TDD |
| 40 | 2300-2400 MHz | 2300-2400 MHz | TDD |
| 41 | 2496-2690 MHz | 2496-2690 MHz | TDD |
| 42 | 3400-3600 MHz | 3400-3600 MHz | TDD |
| 43 | 3600-3800 MHz | 3600-3800 MHz | TDD |

Note
[1]Band 6 is not applicable

TABLE V

Combinations of GSM and WCDMA bands
causing partially colliding bands

| WCDMA bands | GSM Bands |
|---|---|
| I | PCS-1900 |
| II | DCS-1800 |
| III | PCS-1900 |
| IV | — |
| V | (P, E, R, T)GSM-900 |
| VI | (P, E, R)GSM-900 |
| VII | — |
| VIII | GSM-850 |
| IX | PCS-1900 |
| X | — |
| XI | — |
| XII | — |
| XIII | GSM-750 |
| XIV | GSM-750 |
| XIX | (E, R, T)GSM-810 |
| XX | T-GSM-810 |
| XXI | — |
| XXV | DCS-1800 |

Figure 3:
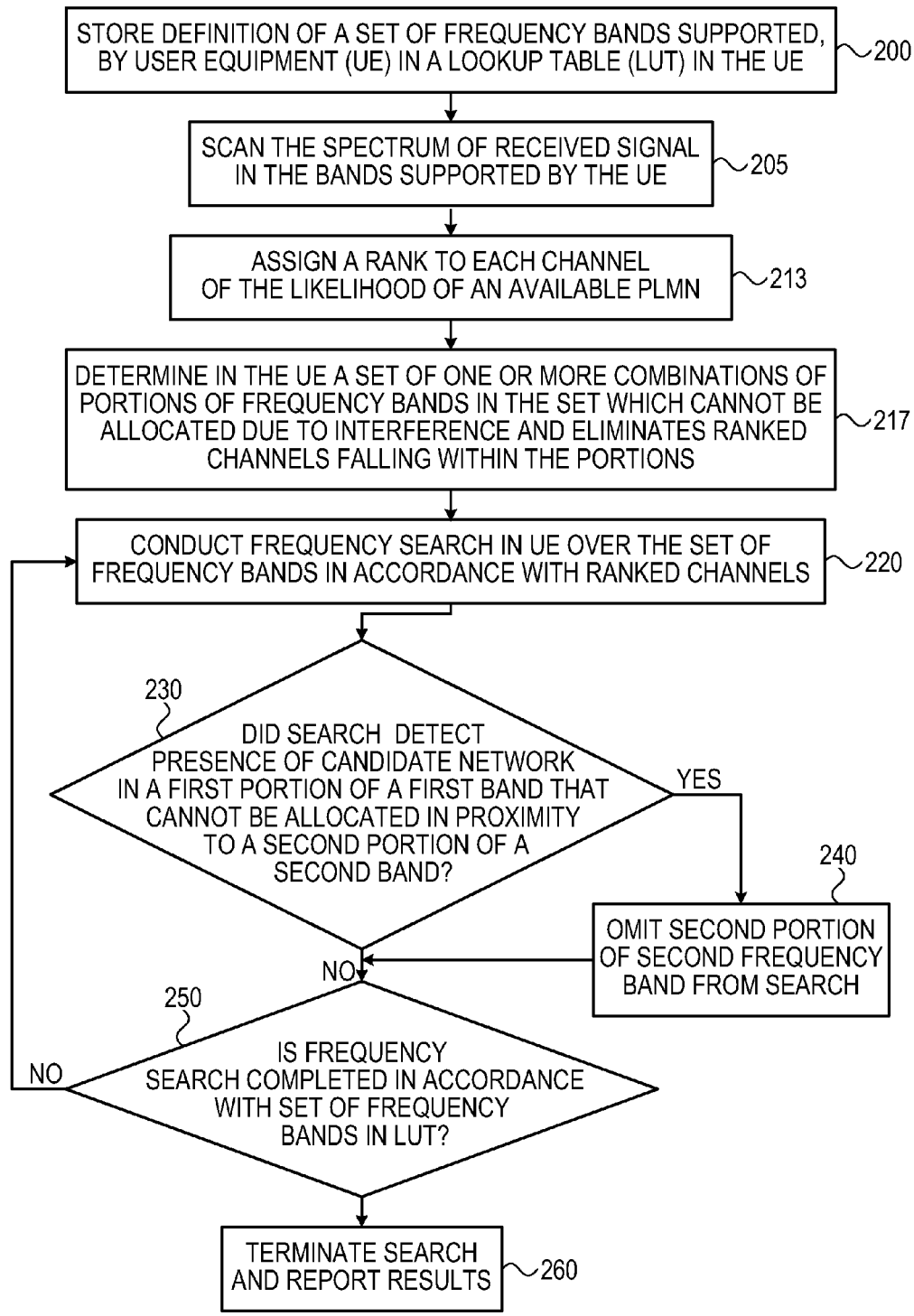
FIG. 3 is a flow chart that schematically illustrates a method for reducing PLMN search time, in accordance with an embodiment that is described herein.

FIG. 3 is a flow chart that schematically illustrates a method for reducing PLMN search time, in accordance with an embodiment that is described herein. In a storing operation 200, processor 130 of UE 100 stores in LUT 150 a definition of a set of frequency bands on which the UE is capable of operating and communicating. Each band comprises multiple frequency channels. The definition comprises at least first and second frequency bands, such that a portion of the first frequency band and a portion of the second frequency may result in a partial overlap colliding frequency sub-band 86, as shown in FIG. 1.

In a scan operation 205, PLMN search module 140 in processor 130 of UE 100 scans the spectrum of the received signal in the bands supported by the UE, typically all the channels in the bands stored in storing operation 200. In an assigning operation 213, module 140 assigns a respective rank to each channel, indicative of the likelihood of an available PLMN within the channel. Module 140 then creates a rank list of the channels ordered according to rank. The rank list can also change the order of the channels based on previous frequency band information of the available PLMNs in the given region stored in memory as described previously. The frequency channels in the rank list will be used by the UE to search for available PLMNs.

In a determining operation 217, module 140 determines one or more combinations of portions of frequency bands in the set, which cannot be allocated in proximity to one another due to interference. In other words, module 140 identifies collision sub-bands such as sub-band 86, and eliminates the ranked channels falling within the portions from the rank list. Module 140 typically uses the rank list and any suitable prior information in order to eliminate channels falling within the frequency collision sub-bands from the rank list. This operation is typically performed before starting the PLMN search process, so as to reduce the PLMN search time.

In an embodiment, the processor directly computes the illegal overlap collision sub-bands from the stored definition from operation 200. Then, module 140 may eliminate frequency collision sub-bands from the rank list by use of information such as the current PLMN frequency channel in which the UE is camped, and other PLMN frequency channel information stored from previous PLMN searches, particularly from previous PLMN searches in the geographic region in which the UE is communicating.

Thus, even before the PLMN search begins, the UE has already reduced the rank list of potential frequency channels over which to search for available PLMNs, thus reducing the search time.

In a searching operation 220, PLMN search module 140 conducts a frequency search in the UE over the set of frequency bands in accordance with the ranked channels. Searching operation 220 starts by searching for available PLMNs using the highest ranked frequency channel in the rank channel list and tries to identify if a valid PLMN exists in the highest ranked frequency channel. In some embodiments, if a valid PLMN exists in the frequency channel, the UE attempts to synchronize with the RAT specific synchronization signal transmitted by a base station at the highest ranked frequency channel by reading the system information blocks (SIB) associated with the channel. If the synchronization attempt fails, the UE moves onto the next highest ranked frequency channel in the rank list, and so forth.

If the synchronization attempt succeeds, module 140 checks whether the search detected the presence of a candidate wireless PLMN network in a first portion of a first frequency band, which cannot be allocated in proximity to a second portion of a second band in the set of the supported frequency bands in a first decision operation 230, i.e., an illegal frequency overlap combination exists. If such a presence is detected, the PLMN search module omits at least the second portion of the second frequency band from the search, in an omitting operation 240 and the second portion of the band is omitted from the rank list. Otherwise, operation 240 is skipped.

In a second decision operation 250, module 140 checks whether the PLMN search is completed in accordance with the set of frequency bands in LUT 150 and the rank list sub-bands. If so, the search is terminated and the results reported to the UE processor in a termination operation 260. If not, the method loops back to operation 220 above, and module 140 continues the frequency search.

In some embodiments, the reported PLMN search results comprise a report table indicating one or more candidate PLMNs that are available, possibly with corresponding frequency channels, other RAT specific parameters and quality scores. In some embodiments, the UE processor is configured to choose a preferred wireless network (e.g., preferred PLMN) from the search results.

In yet other embodiments, decision step 230 for detecting the presence of a candidate network further comprises evaluating the first portion of the first frequency band and verifying that the UE can synchronize with the candidate PLMN, read system information blocks (SIB), and extract network parameters, such as determining if the PLMN is the home PLMN assigned to the user.

When conducting a PLMN search, it is not recommended to omit portions of bands from the search based on rank alone, since the measurements leading to the rank may be distorted. One possibility for identifying a PLMN with very high likelihood is to decode SIBs, since the SIBs are typically protected by Cyclic Redundancy Check (CRC).

Although the embodiments described herein mainly address reducing PLMN search time in cellular networks, the methods and systems described herein can be applied to any other wireless system where different bands are defined, and where some of the band combinations may collide resulting in coexistence problems.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
   storing in a mobile communication terminal a definition of a set of frequency bands in which the terminal is configured to communicate, including at least first and second frequency bands;
   determining in the terminal one or more combinations of at least portions of the frequency bands in the set that cannot be allocated in proximity to one another due to interference;
   conducting in the terminal a search over the set of the frequency bands; and
   upon detecting a presence of a candidate wireless network in a first portion of the first frequency band, which cannot be allocated in proximity to at least a second portion of the second frequency band in accordance with the specification, omitting at least the second portion from the search.

2. The method according to claim 1, wherein storing the definition comprises specifying that the terminal is configured to communicate in the first and second frequency bands using first and second different Radio Access Technologies (RAT), respectively.

3. The method according to claim 2, wherein specifying the RATs comprises specifying that the terminal is configured to communicate in one of the first and second frequency bands using Frequency Division Duplex (FDD), and in the other of the first and second frequency bands using Time Division Duplex (TDD).

4. The method according to claim 1, wherein detecting the presence comprises evaluating the first portion without being camped on any wireless network.

5. The method according to claim 1, wherein detecting the presence comprises identifying that the terminal is camped on a wireless network.

6. The method according to claim 5, wherein detecting the presence comprises evaluating the first portion while the terminal is camped on a wireless network in a third frequency band in the set.

7. The method according to claim 1, and comprising, prior to the search, recording in the terminal one or more previous wireless networks that the terminal communicated with, and respective frequency channels and country codes of the previous wireless networks, and removing the second portion from the search upon detecting that the terminal is currently operating in a given country and that one of the previous wireless networks recorded in the given country operates in the first portion.

8. The method according to claim 1, wherein conducting the search comprises searching over the frequency bands in the set for a valid wireless network.

9. The method according to claim 1, comprising omitting the second portion from the search upon detecting that a downlink or uplink frequency of the candidate wireless network falls in the first portion.

10. The method according to claim 1, wherein determining the combinations comprises calculating the combinations in the terminal based on the stored definition of the frequency bands.

11. The method according to claim 1, wherein determining the combinations comprises storing a predefined specification of the combinations in the terminal.

12. A communication apparatus, comprising:
a transceiver, which is configured to communicate with wireless networks; and
a processor, which is configured to store a definition of a set of frequency bands in which the transceiver is configured to communicate, including at least first and second frequency bands, to determine one or more combinations of at least portions of the frequency bands in the set that cannot be allocated in proximity to one another due to interference, to conduct using the transceiver a search over the set of the frequency bands, and, upon detecting a presence of a candidate wireless network in a first portion of the first frequency band, which cannot be allocated in proximity to at least a second portion of the second frequency band in accordance with the specification, to omit at least the second portion from the search.

13. The apparatus according to claim 12, wherein the processor is configured to store the definition by specifying that the terminal is configured to communicate in the first and second frequency bands using first and second different Radio Access Technologies (RAT), respectively.

14. The apparatus according to claim 12, wherein the processor is configured to detect the presence by evaluating the first portion while the transceiver is not camped on any wireless network.

15. The apparatus according to claim 12, wherein the processor is configured to detect the presence by identifying that the transceiver is camped on a wireless network.

16. The apparatus according to claim 15, wherein the processor is configured to detect the presence by evaluating the first portion while the transceiver is camped on a wireless network in a third frequency band in the set.

17. The apparatus according to claim 12, wherein the processor is configured to record in the terminal, prior to the search, one or more previous wireless networks that the terminal communicated with, and the respective frequency bands and country codes of the previous wireless networks, and to remove the second portion from the search upon detecting that the terminal is currently operating in a given country and that one of the previous wireless networks recorded in the given country operates in the first portion.

18. The apparatus according to claim 12, wherein the processor is configured to conduct the search over the frequency bands in the set for a preferred wireless network.

19. A mobile communication terminal comprising the apparatus of claim 12.

20. A chipset for processing signals in a mobile communication terminal, comprising the apparatus of claim 12.

* * * * *